United States Patent

Harman et al.

[15] 3,689,088
[45] Sept. 5, 1972

[54] WORK HOLDING DEVICE FOR MACHINE TOOL

[72] Inventors: Julius Harman, 9 Holly Walk, Baginton; Michael Eric Norman, 14 Sandy Crescent, Hollycroft, Hinckley, both of England

[73] Assignee: Alfred Herbert Limited, Coventry, England

[22] Filed: Oct. 15, 1970

[21] Appl. No.: 81,012

[30] Foreign Application Priority Data

Oct. 15, 1969 Great Britain..........50,583/69

[52] U.S. Cl. ................................279/110, 287/53 R
[51] Int. Cl. .............................................B23b 5/22
[58] Field of Search.......279/71, 110, 114; 287/53 R, 287/53 SS

[56] References Cited

UNITED STATES PATENTS

| | | | |
|---|---|---|---|
| 2,358,049 | 9/1944 | Bogart | 279/114 |
| 2,822,181 | 2/1958 | Sloan | 279/114 |

*Primary Examiner*—Gerald A. Dost
*Attorney*—Holman & Stern

[57] ABSTRACT

A work holding device for a machine tool includes means for axial location on a machine tool spindle and coupling means urging the device into said coaxial location. The coupling means is operated by actuating means driven by a member extending from the machine tool. Work holding means on the device may also be driven by the same member on the machine tool.

10 Claims, 3 Drawing Figures

INVENTOR
Julius Harman & Michael Eric Norman.
Holman & Stern
ATTORNEYS

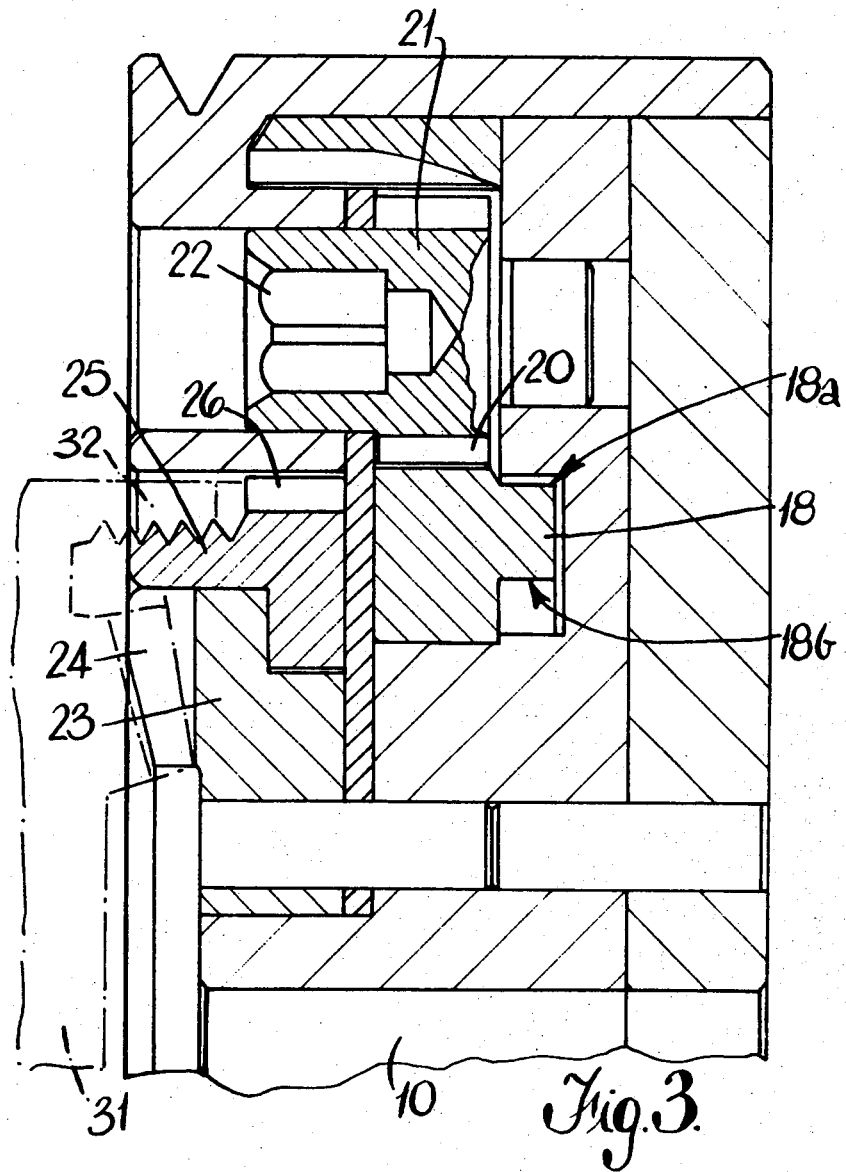

WORK HOLDING DEVICE FOR MACHINE TOOL

The invention relates to a work-holding device for a machine tool and has as an object to provide such a device in a convenient form.

According to the invention a work-holding device for a machine tool comprises a body, a locating means on the body for locating the body coaxially with a machine tool spindle, coupling means on the body adapted on actuation to engage associated means on the said spindle to urge the said locating means into close interengagement with a complementary locating means on the spindle and actuating means mounted on the body for actuating said coupling means.

Figure 1:
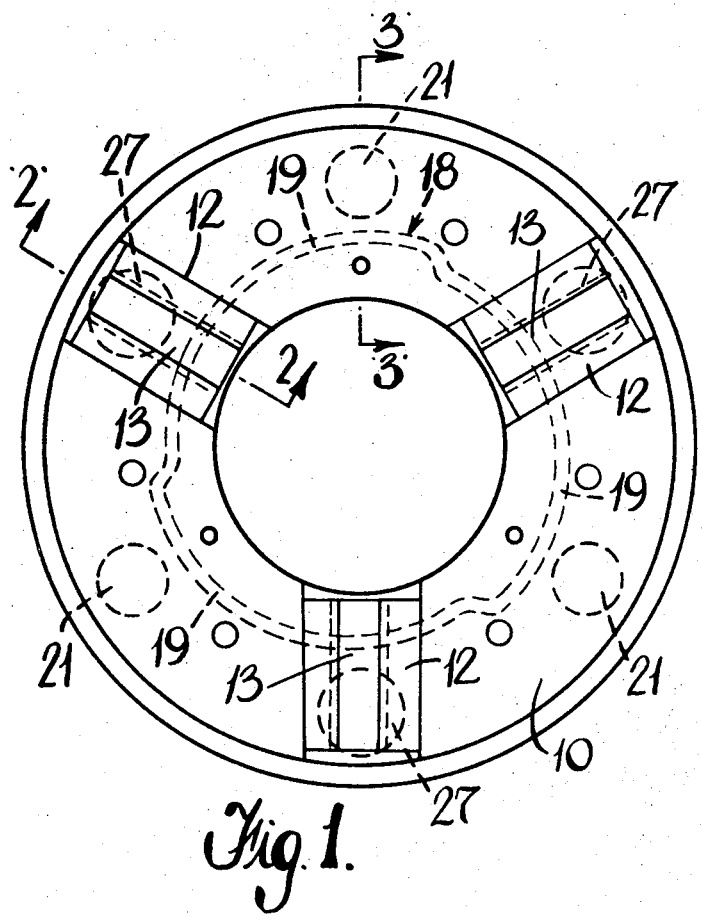
Figure 2:
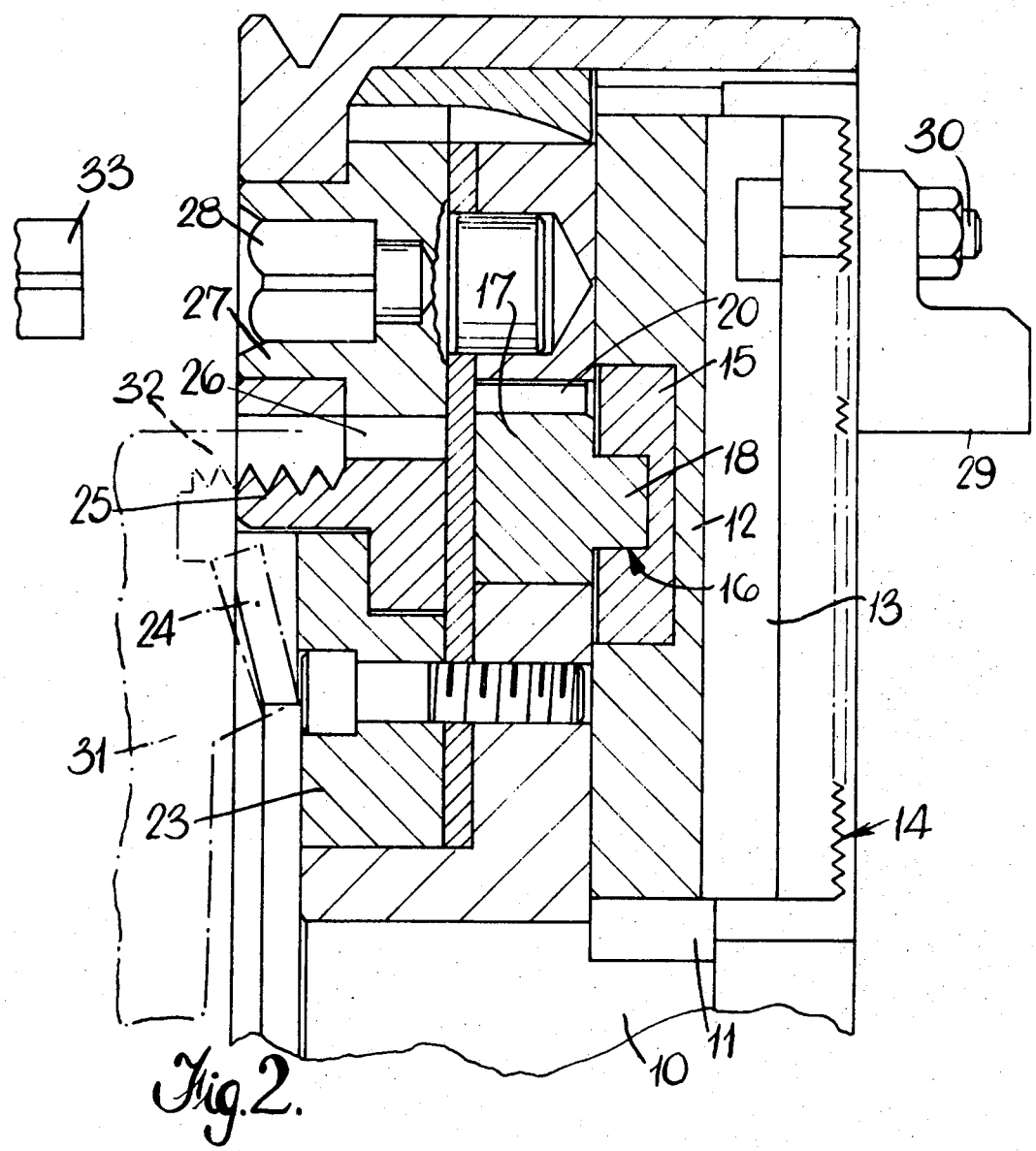

In an embodiment of the invention shown in the following drawings:

FIG. 1 shows an end view of a chuck; and
FIGS. 2 and 3 show, to a different scale, sections on the corresponding lines in FIG. 1.

A chuck has a body 10 having one face formed with three equispaced radial grooves 11 in which members 12 are slidable. Each member 12 is formed with a T-slot 13 extending along its length and also with serrations 14 on outwardly directed faces on either side of the slot 13. Each member 12 also includes a bush 15 rotatably mounted therein and formed with a transverse arcuate slot 16 of a form later to be described.

A cam ring 17 is mounted within the body 10 for rotation about the axis thereof and includes an axially extending part 18. The faces 18a, 18b of the part 18 are parallel and define three arcuate portions 19 of the part 18, each arcuate portion 19 having a center displaced from the axis of the body 10. Each arcuate portion 19 engages a respective one of the slots 16, each of which is formed with a radius substantially the same as that of the corresponding arcuate portion 19. The periphery of the ring 17 is formed with gear teeth 20. Three spur gears 21 are journalled in the body 10 and mesh with the teeth 20. Each spur gear 21 is formed with a square-section recess 22 adapted to receive a key means 33 extending parallel to the axis of the chuck. The said key means may form part of the associated machine tool or may be a separate item, and may be rotated either manually or automatically.

The body 10 includes a locating means comprising a ring 23 having radial gear teeth 24 which form an interval bevel gear with a re-entrant pitch cone. The teeth 24 are adapted to engage a complementary locating means in the form of a bevel gear fixedly mounted co-axially on the spindle 31 of the associated machine tool. Rotatably engaged on the ring 23 is a threaded sleeve 25 peripherally formed with gear teeth 26 over part of its length. The sleeve 25 is engageable with a corresponding threaded portion 32 on the associated machine tool spindle 31. Three spur gears 27 are journalled in the body 10 and engage the gear teeth 26. Each gear 27 is formed with a square-section recess 28 adapted to receive the aforementioned key means on the associated machine tool.

Associated with each member 12 is a jaw 29 formed on one face with serrations corresponding to the serrations 14 and also having through holes. T-bolts 30 engageable with the T-slots 13 are mounted in the said holes and enable the jaws to be secured in suitable radial positions on the member 12. The chuck may thus be adapted to support workpieces of widely differing sizes, notwithstanding the limited radial movement of the members 12.

In one method of use the chuck is placed in an initial axial alignment with the machine tool spindle and rotated until the recess 28 in one of the spur gears 27 is aligned with an aforementioned key means on the machine tool. The key means is then axially advanced into engagement with the gear 27 and rotated. The sleeve 25 thus rotates and engages its corresponding associated threaded portion on the spindle. The chuck is thereby advanced until the gear teeth of the locating means on the chuck and spindle are in close interengagement. The key means is then withdrawn and the chuck and spindle rotated together until the said key means is aligned with a recess 22 in one of the gears 21. The key means is then used to rotate the cam ring 17 and thereby to bring the chuck jaws into gripping engagement with a workpiece.

In an arrangement in which a key means forms part of an associated machine tool it may be provided that the clearance between the face of the chuck on to which the gears 21, 27 open and the adjacent face of the machine tool is such that when the chuck is in or near its operating position, gears 21, 27 can be engaged only by the said key means.

Having thus described our invention what we claim as new and desire to secure by Letters Patent is:

1. A work holding device for machine tool, comprising: a body; a plurality of work-engaging means movably mounted on the body; first actuating means for displacing said work engaging means in unison towards an axis of the body; locating means on the body for locating the body co-axially with a machine tool spindle, coupling means on the body adapted on actuation to engage associated means on said spindle to urge the locating means into close interengagement with complementary locating means on the spindle; and second actuating means on the body for actuating said coupling means.

2. A device as claimed in claim 1 in which the locating means comprises a plurality of projections on the body which engage complementary projections on the machine tool spindle.

3. A device as claimed in claim 2 in which the said projections comprise radially extending serrations.

4. A device as claimed in claim 3 in which the projections are in the form of bevel gear teeth.

5. A device as claimed in claim 4 in which the said teeth form an internal bevel gear.

6. A device as claimed in claim 1 in which the coupling means comprises a threaded portion rotatable with respect to the body and said second actuating means is operable to rotate the coupling means.

7. A device as claimed in claim 6 in which the said second actuating means is adapted to be engaged by a driving member on the machine tool.

8. A device as claimed in claim 6 in which the said threaded portion is formed on a geared ring coaxial with the body and in which the said second actuating means comprises a spur gear in mesh with the ring and with its axis in spaced parallel relationship with the axis of the body.

9. A work holding device as claimed in claim 1 wherein said first actuating means includes a cam ring having as many cam profiles making up the cam ring circumference as there are work engaging means, and means engaging said cam profiles and constrained to move radially with respect to the axis of the body.

10. A work holding device as claimed in claim 1 further comprising in combination a driving member which is adapted to be rotated by the machine-tool which member is movable parallel to the axis of the body to selectively engage either the first actuating means or the second actuating means.

* * * * *